United States Patent
Kawakita et al.

(10) Patent No.: US 11,345,369 B2
(45) Date of Patent: May 31, 2022

(54) VEHICLE CONTROL METHOD AND SYSTEM

(71) Applicant: DENSO CORPORATION, Kariya (JP)

(72) Inventors: Kouji Kawakita, Kariya (JP); Minoru Okada, Kariya (JP)

(73) Assignee: DENSO CORPORATION, Kariya (JP)

( * ) Notice: Subject to any disclaimer, the term of this patent is extended or adjusted under 35 U.S.C. 154(b) by 213 days.

(21) Appl. No.: 16/867,926

(22) Filed: May 6, 2020

(65) Prior Publication Data
US 2020/0353950 A1   Nov. 12, 2020

(30) Foreign Application Priority Data

May 8, 2019 (JP) .............................. JP2019-088016

(51) Int. Cl.
*B60W 60/00* (2020.01)
*G08G 1/095* (2006.01)
*B60W 30/18* (2012.01)
*G06K 9/00* (2022.01)

(52) U.S. Cl.
CPC .. *B60W 60/0015* (2020.02); *B60W 30/18154* (2013.01); *G06K 9/00825* (2013.01); *G08G 1/095* (2013.01); *B60W 2552/00* (2020.02); *B60W 2555/60* (2020.02)

(58) Field of Classification Search
CPC ....... B60W 60/0015; B60W 30/18154; B60W 2552/00; B60W 2555/60; B60W 2552/53; B60W 2720/106; B60W 30/181; B60W 30/18159; G06K 9/00825; G08G 1/095; G08G 1/096; G08G 1/096725; G08G 1/096758; G08G 1/096783; G08G 1/09623
See application file for complete search history.

(56) References Cited

U.S. PATENT DOCUMENTS 11,084,489 B2 * 8/2021 Ogino ............. B60W 30/18154

FOREIGN PATENT DOCUMENTS

JP      2006-139707 A     6/2006

* cited by examiner

*Primary Examiner* — Ian Jen
(74) *Attorney, Agent, or Firm* — Maschoff Brennan (57) ABSTRACT

A method includes the step of receiving traffic signal display information from a traffic control unit controlling a display of a traffic signal located near an intersection when a vehicle is driving toward the intersection. The traffic signal display information includes a current display state of the traffic signal and information indicating a remaining time for which the current display state of the traffic signal will continues. The method further includes the step of acquiring traffic signal recognition information when the vehicle is driving toward the intersection. The traffic signal recognition information is recognized by a traffic signal detector mounted on the vehicle and indicating a current display of the traffic signal. The method further includes the step of controlling driving of the vehicle when the vehicle enters the intersection based on the traffic signal display information and the traffic signal recognition information.

10 Claims, 9 Drawing Sheets

VEHICLE CONTROL METHOD AND SYSTEM

CROSS-REFERENCE TO RELATED APPLICATION

This patent application is based on and claims priority to Japanese Patent Application No. 2019-088016, filed on May 8, 2019 in the Japan Patent Office, the entire disclosure of which is hereby incorporated by reference herein.

BACKGROUND

Technical Field

The present disclosure relates to a method for controlling a vehicle and a vehicle control system.

Related Art

Conventionally, to control a vehicle to run in accordance with a display of a traffic signal, various technologies have been proposed. For example, a known art discusses a technology in that a vehicle-mounted device receives time information from a ground communication device when a display of a traffic signal located near an intersection is switched. The vehicle-mounted device then calculates and provides a vehicle speed at which a vehicle can pass through the intersection based on the time information and a distance from the vehicle to the intersection.

SUMMARY

Accordingly, one aspect of the present disclosure provides a novel method of controlling a vehicle. The method includes the step of receiving traffic signal display information from a traffic control unit controlling a display of a traffic signal located near an intersection when a vehicle is driving toward the intersection. The traffic signal display information includes a current display state of the traffic signal and information indicating a remaining time when the current display state of the traffic signal continues. The method further includes the step of acquiring traffic signal recognition information when the vehicle is driving toward the intersection. The traffic signal recognition information is recognized by a traffic signal detector mounted on the vehicle and indicating a current display of the traffic signal. The method further includes the step of controlling driving of the vehicle when the vehicle enters the intersection based on the traffic signal display information and the traffic signal recognition information.

Another aspect of the present disclosure provides a novel control system that controls a vehicle. The control system includes a traffic control unit to control a display of a traffic signal located near an intersection, a vehicle control unit to control driving of the vehicle and a signal detector to detect a display currently displayed on the traffic signal, the signal detector being mounted on the vehicle. When the vehicle enters the intersection, the vehicle control unit controls driving of the vehicle based on traffic signal display information including both a current display state of the traffic signal and information indicating a remaining time the current display state of the traffic signal continues, the traffic signal display information being received from the traffic control unit when the vehicle is driving toward the intersection, and signal recognition information indicating the current display of the traffic signal obtained from the traffic signal detector.

Hence, according to the control method of controlling the vehicle of this embodiment, driving of the vehicle entering the intersection is controlled based on two types of information composed of the traffic signal display information and the traffic signal recognition information. Accordingly, even if the operation timing of the traffic signal deviates from a command indicated by the traffic signal display information, the deviation can be handled by the traffic signal recognition information. Thus, based on two types of information respectively indicating a display of the traffic signal, the vehicle can be more appropriately controlled and driven in accordance with an actual traffic condition.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

As described above, Japanese Patent Application Laid Open No. 2006-139707 (JP-2006-139707-A)) discusses a technology in that a vehicle-mounted device receives time information from a ground communication device when a display of a traffic signal located near an intersection is switched. The vehicle-mounted device then calculates and provides a vehicle speed at which a vehicle can pass through the intersection based on the time information and a distance from the vehicle to the intersection.

However, due to delay in response of a traffic signal, a timing when a display of the traffic signal is switched is sometimes deviated from a timing indicated by control information controlling the display of the traffic signal.

Further, when the vehicle-mounted device receives control information that externally controls the traffic signal as discussed in the known art, because of either delay in communication of the control information or occurrence of an error when the control information is coded, a timing when a display of the traffic signal is switched sometimes deviates from a timing indicated by the control information as received. Accordingly, when driving of the vehicle entering the intersection is controlled based only on the control information of the traffic signal, the vehicle is likely not to follow an actual display of the traffic signal.

Figure 1:
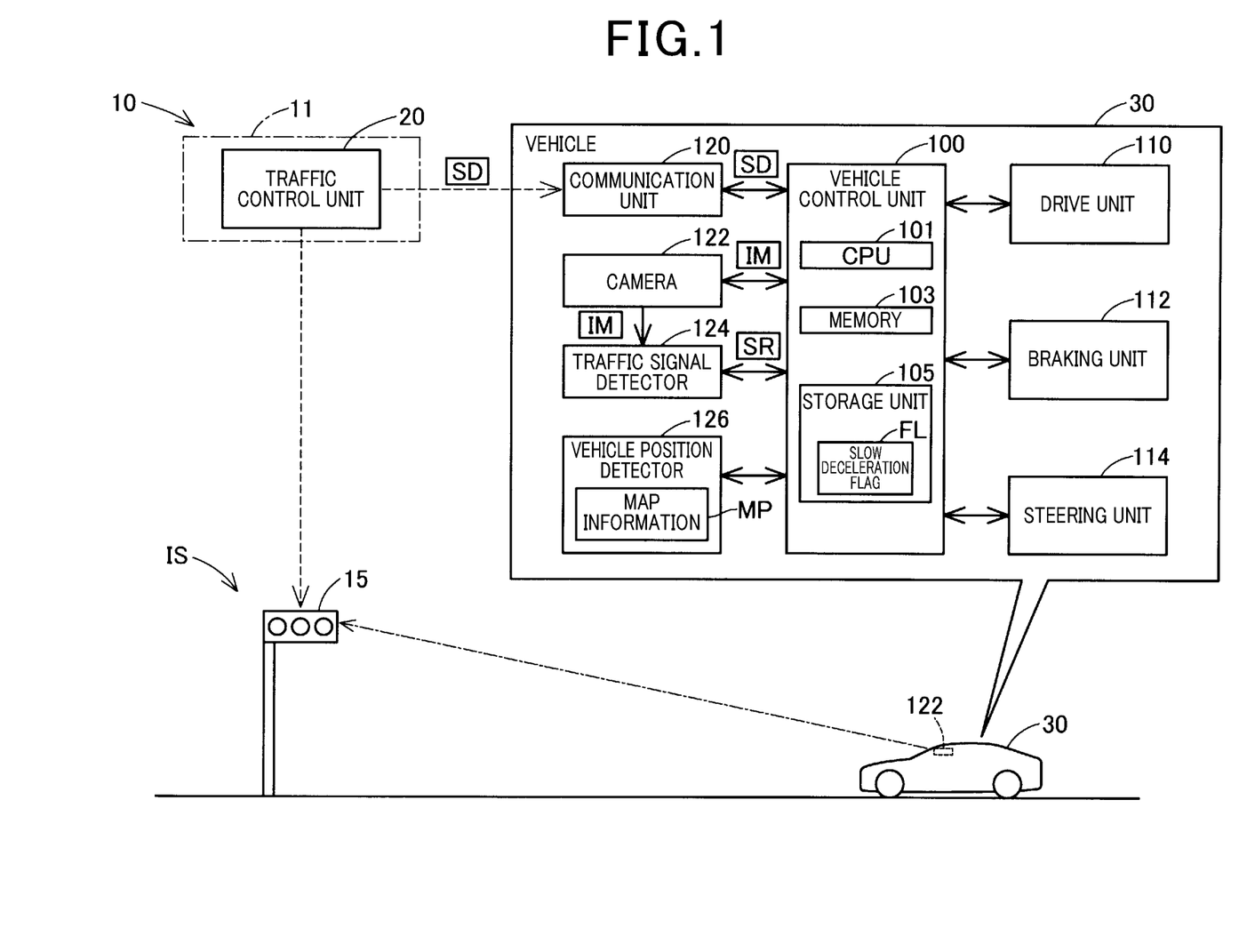
FIG. 1 is a schematic diagram illustrating a traffic control system according to a first embodiment of the present disclosure.

Referring now to the drawings, wherein like reference numerals designate identical or corresponding parts throughout the several views thereof, and to FIG. 1, a first embodiment of the present disclosure is described. As shown in FIG. 1, a traffic control system 10 of the first embodiment includes a traffic signal 15 for controlling traffic at an intersection IS, a traffic control unit 20 for controlling a display of the traffic signal 15, and a vehicle control unit 100 mounted on a vehicle 30 as an on-vehicle device. In the traffic control system 10, when the vehicle 30 passes through an intersection IS, the vehicle control unit 100 controls driving of the vehicle 30 based on traffic signal information SD sent from the traffic control unit 20 as described later in detail and signal recognition information SR obtained from a position detector 126 provided in the vehicle 30 as also described later in detail.

The traffic control unit 20 is disposed in a traffic control center 11 that performs traffic control. The traffic control unit 20 switches a display of the traffic signal 15 located near the intersection IS at a prescribed cycle. Specifically, in the first embodiment, the traffic signal 15 switches a signal light among a green light that allows a vehicle 30 to enter the intersection IS, a red light for instructing the vehicle 30 to stop in front of the intersection IS and a yellow light displayed next to the green light to warn that it changes to the red light. Here, in addition to the aforementioned green light signal, the traffic signal 15 may display an arrow signal indicating a driving direction allowing the vehicle 30 to drive entering the intersection IS.

Here, the vehicle 30 performs manual operation for driving the vehicle 30 in accordance with driving operation performed by a driver. The vehicle 30 also performs automatic operation in which the vehicle control unit 100 determines a driving state of the vehicle 30. Herein below, a term automatic driving means driving in which at least a portion of each of drive control, steering angle control and braking control of the vehicle is automatically executed by computer processing without intervention of driver's driving operation. Further, a term manual driving herein below means driving in which one of the drive control, the steering angle control and the braking control of the vehicle is executed by intervention of driver's driving operation. Hence, in the first embodiment, the vehicle 30 usually travels in automatic driving. The automatic driving is switched to manual driving by prescribed operation of the driver. In other embodiments, the vehicle 30 can usually travel in manual driving, and the manual driving can be switched to the automatic driving when a prescribed condition is satisfied, such as when the vehicle 30 approaches a position located before the intersection IS by a prescribed distance, etc.

In the first embodiment, the vehicle control unit 100 is configured by an ECU (Electronic Control Unit) composed of a central processing unit (CPU) 101 and a memory 103 serving as a main storage device. The vehicle control unit 100 has various functions to control driving of the vehicle 30 by executing program and instructions loaded in the memory 103. Here, at least a portion of these functions of the vehicle control unit 100 may be realized by hardware circuits.

The vehicle control unit 100 further includes a storage unit 105 for storing various information, such as program, variables, etc., used in controlling the vehicle. The various information stored in the storage unit 105 includes a soft deceleration flag FL used in drive control performed in the vehicle 30 at the intersection IS. The soft deceleration flag FL is a variable to which a value indicating a determination of whether to perform soft deceleration control described later is assigned. For example, if a determination of whether to perform the deceleration control is positive, the deceleration flag FL is brought to an ON state. By contrast, if a determination of whether to perform the deceleration control is negative, the deceleration flag FL is brought to an OFF state.

Further, in addition to the vehicle control unit 100, the vehicle 30 includes a drive unit 110, a braking unit 112 and a steering unit 114. The vehicle control unit 100 performs drive control for the above-described automatic driving and drive control in accordance with driving operation performed by the driver by controlling the drive unit 110, the braking unit 112 and the steering unit 114. Further, the drive unit 110 is, for example, composed of an internal combustion engine or a motor to generate driving force for rotating drive wheels of the vehicle 30. The braking unit 112 is, for example, composed of an electronically controlled brake system (ECB; Electrically Controlled Brake System) to control braking of the drive wheels of the vehicle 30. The steering unit 114 is, for example, composed of an electric power steering system (EPS; Electric Power Steering) to control a steering angle of each of the wheels of the vehicle 30 for example.

The vehicle 30 further includes a communication unit 120, a camera 122, a signal detector 124, and a position detector 126. The communication unit 120 is controlled by the vehicle control unit 100 when performing wireless communication with the traffic control unit 20. To control driving of the vehicle 30 passing through the intersection IS, the vehicle control unit 100 receives traffic signal information SD acting as control information controlling the traffic signal 15, from the traffic control unit 20 through the communication unit 120. The traffic signal information SD at least includes information indicating a current display of the traffic signal 15 and information indicating a remaining time during when a current display state of the traffic signal 15 continues. However, the information indicating the remaining time during when the current display state of the traffic signal 15 continues may be information indicating a switching cycle in which a display of the traffic signal 15 is switched from one to another.

The camera 122 is, for example, constituted by either a CCD (Charge Coupled Device) or a CMOS (Complementary Metal Oxide Semiconductor) image sensor. Subjected to control of the vehicle control unit 100, the camera 112 generates a captured image IM by capturing a scenery in a driving direction of the vehicle 30. When determining a driving path along which the vehicle 30 runs, the vehicle control unit 100 analyzes the captured image IM and detects objects, such as obstacles present in front of the vehicle 30, road signs or pedestrians present around the vehicle 30 therein, etc. Further, the vehicle control unit 100 detects a distance between the object reflected (i.e., appearing) in the captured image IM and the vehicle 30. Either in addition to or instead of the camera 122, the vehicle 30 may include a sensor used by the vehicle control unit 100 to detect the object around the vehicle 30. As the sensor, a LiDER (Light Detection and Ranging) may be employed, for example.

Further, subjected to control of the vehicle control unit 100, the traffic signal detector 124 optically detects a display of the traffic signal 15 located in front of the vehicle 30. That is, in the first embodiment, when the vehicle 30 is driving toward the intersection IS, the traffic signal detector 124 acquires the captured image IM from the camera 122 and analyzes the captured image IM thereby detecting a current display of the traffic signal 15 located at the intersection IS. The traffic signal detector 124 then outputs signal recognition information SR as a detection result indicating the current display of the traffic signal 15 to the vehicle control unit 100. Further, as described earlier, the vehicle control unit 100 controls driving of the vehicle 30 based on the traffic signal recognition information SR obtained from the traffic signal detector 124 when the vehicle 30 passes through the intersection IS. The traffic signal detector 124 may be configured as a function of the vehicle control unit 100 as described above or is configured as a device integrated with the camera 122.

Further, the position detector 126 detects a current position of the vehicle 30 with ref to map information MP. The position detector 126 identifies the current position of the vehicle 30 and outputs an identification result to the vehicle control unit 100, for example, based on a GNSS (Global Navigation Satellite System). Hence, when the position detector 126 detects the vehicle 30 driving toward the intersection IS, the vehicle control unit 100 starts drive control to control the vehicle 30 to properly pass through the intersection IS.

Figure 2:
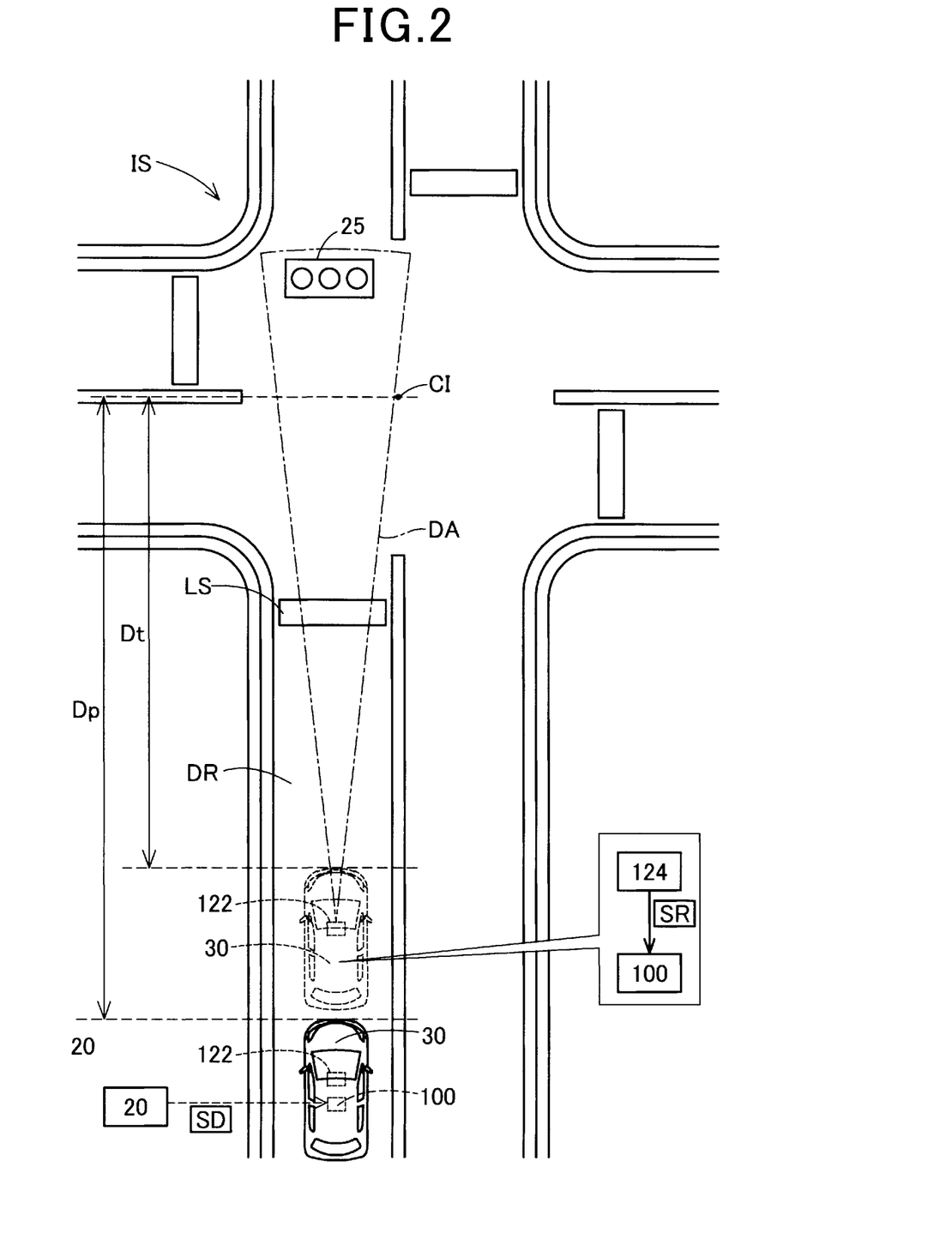
FIG. 2 is a bird's-eye view schematically illustrating an example of an intersection through which the vehicle passes.

Now, with reference to FIG. 2, an overview of drive control performed by the vehicle control unit 100 at the intersection IS is herein below described. That is, in FIG. 2, for convenience, only the traffic signal 15 that displays signals for a driving lane DR along which the vehicle 30 runs is shown. When it is detected that a distance from the vehicle 30 to the intersection IS became less than a prescribed threshold distance Dp, the vehicle control unit 100 receives traffic signal information SD from the traffic control unit 20 and starts drive control for the vehicle 30 in accordance with the current display of the traffic signal 15 as indicated by the traffic signal information SD. Here, the distance to the intersection IS is defined by a distance between a tip of the vehicle 30 and a center CI of the intersection IS in a straight forward direction of the vehicle both 30 along the driving lane DR.

As will be described later, the vehicle control unit 100 determines a manner of drive control performed in the vehicle 30 based on a current driving state of the vehicle 30 and the traffic signal information SD. The vehicle control unit 100 then controls the vehicle 30 in accordance with the manner of the drive control. Here, in the present disclosure, the term the driving state of the vehicle 30 is represented by a current state of the vehicle 30, such as a speed and a position of the vehicle 30, an acceleration, a steering angle, a braking state, a gear currently selected, etc. Also, in the present disclosure, the term the manner of the drive control of the vehicle 30 is represented by a type of drive control executed to run the vehicle 30 and conditions for executing the drive control or the like.

Further, in the first embodiment, the driving control performed in the vehicle 30 at the intersection IS includes stop deceleration control, soft deceleration control and deceleration suppression control. The stop deceleration control is control in which a vehicle 30 is stopped before the vehicle 30 enters the intersection IS, i.e., the vehicle 30 runs over a stop line LS drawn in the intersection IS. The soft deceleration control is control to gradually decelerate the vehicle 30 by an amount of deceleration less than a prescribed normal stop limit deceleration obtained based on experiments or the like. Here, the normal stop limit deceleration is a limit of a deceleration in which the vehicle 30 is expected to be able to normally stop without horizontal slippage or rolling over. Accordingly, the normal stop limit deceleration is a deceleration at which application of a significantly increased amount of load to a driver is expected. For example, the normal stop limit deceleration may be greater than 0.5 G and less than 1.5 G. Further, deceleration suppression control is control to suppress deceleration of the vehicle 30 to drive the vehicle 30 at a speed higher than a current speed.

Here, in the first embodiment, to perform drive control at the intersection IS, the vehicle control unit 100 designates a soft deceleration region based on a relation between a speed of the vehicle 30 and a position of the vehicle 30 relative to the intersection IS. The vehicle control unit 100 then determines a manner of drive control performed in the vehicle 30 based on the soft deceleration region. However, the soft deceleration region and the method of designating the soft deceleration region will be described later in detail.

Further, when the vehicle 30 approaches a point located before the intersection IS by a distance less than a distance Dt, the vehicle control unit 100 obtains signal recognition information SR from the traffic signal detector 124. The distance Dt is a distance at which the traffic signal 15 enters a detection range DA covered by (i.e., detectable to) the traffic signal detector 124. Specifically, the detection range DA is a region in which the traffic signal detector 124 is expected to recognize a display of the traffic signal 15 with prescribed accuracy, and is experimentally determined in advance. Further, when it acquires traffic signal recognition information SR, the vehicle control unit 100 utilizes the traffic signal recognition information SR in performing drive control in the vehicle 30. Specifically, as will be described later in detail, in the first embodiment, the vehicle control unit 100 determines whether to maintain a manner of drive control determined to be performed in the vehicle 30 based on the traffic signal information SD and a current driving state of the vehicle 30, based on the traffic signal recognition information SR.

Now, with reference to FIGS. 3A and 3B, a soft deceleration region Zsd and a designating (i.e., calculating) method of designating (i.e., calculating) the soft deceleration region Zsd used in determining a method of driving control is herein below described. As shown in each of exemplary graphs shown in FIGS. 3A and 3B, a vertical axis indicates a speed of a vehicle 30 that drives toward the intersection IS. A horizontal axis indicates a distance from the vehicle 30 to a stop line LS drawn in the intersection IS.

Figure 3A:
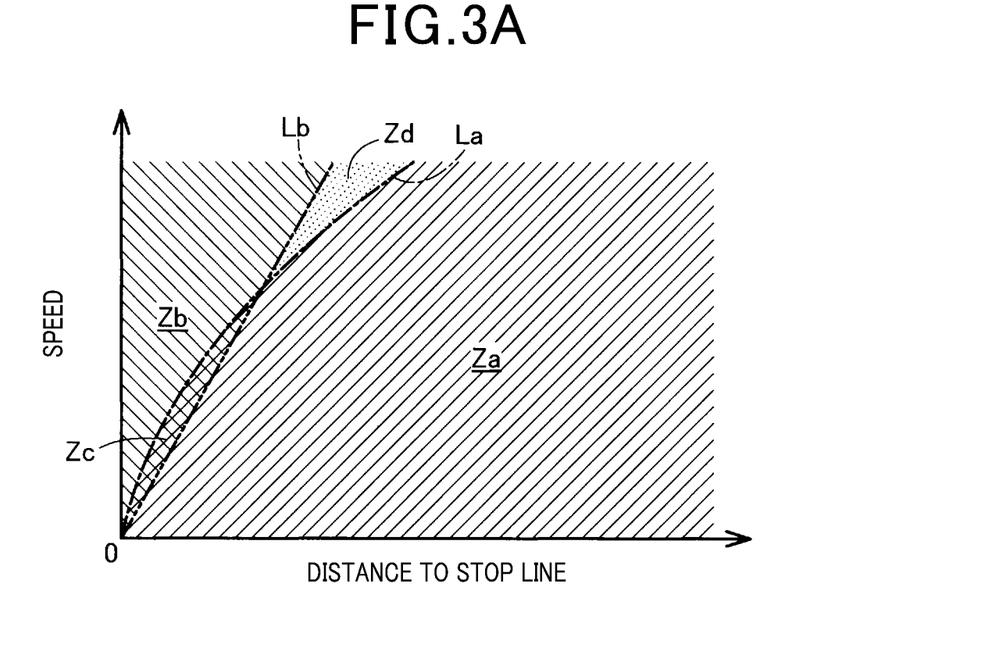
FIG. 3A is a diagram illustrating an optional zone and a no options zone.

As shown in FIG. 3A, a curve La indicated by a single-dot chain line shows a relation between a speed of a vehicle 30 and a position of the vehicle 30 when the vehicle 30 can be stopped at a stop line LS in the intersection IS if it is decelerated by the above-described normal stop limit deceleration. That is, a right region Za with a diagonal hatching pattern facing a right side of the curve La indicates a region in which the vehicle 30 can be stopped at the stop line LS when it is decelerated by an amount of deceleration less than the normal stop limit deceleration. Hence, hereinafter, a speed defining the curve La is sometimes referred to as stop limit speed.

Further, a linear line Lb indicated by a two-dot chain line shows a relation between a limit speed of a vehicle 30 and a distance of the vehicle 30 that allows the vehicle 30 to be able to enter the intersection IS after a display of a traffic signal 15 is changed to a yellow light before the vehicle 30 enters the intersection IS and the display of the traffic signal 15 is maintained to be the yellow light. Hence, a left region Zb with a diagonal hatching pattern facing a left side of the linear line Lb is a region where the vehicle 30 can enter the intersection while the traffic light of the traffic signal 15 is yellow. Hence, hereinafter, a limit speed defining the linear line Lb is sometimes referred to as an entry limit speed.

Further, a region Zc where the regions Za and Zb overlap with each other is a so-called optional zone. That is, when the display of the traffic signal 15 is changed to the yellow light and the speed and the position of the vehicle 30 are in the optional zone Zc, the vehicle 30 can either enter the intersection IS before the traffic signal 15 is changed to a red light or stop in front of the intersection IS even if it is decelerated by an amount of deceleration less than the normal stop limit deceleration. Further, a region Zd with a dot hatching pattern sandwiched by the regions Za and Zb is a so-called no options zone. That is, when the display of the traffic signal 15 is changed to the yellow light and the speed and the position of the vehicle 30 are in the no options zone Zd, the vehicle 30 can neither enter the intersection IS before the display of the traffic signal 15 is changed to the red light nor stop in front of the intersection IS if it is decelerated by an amount of deceleration less than the normal stop limit deceleration.

Figure 3B:
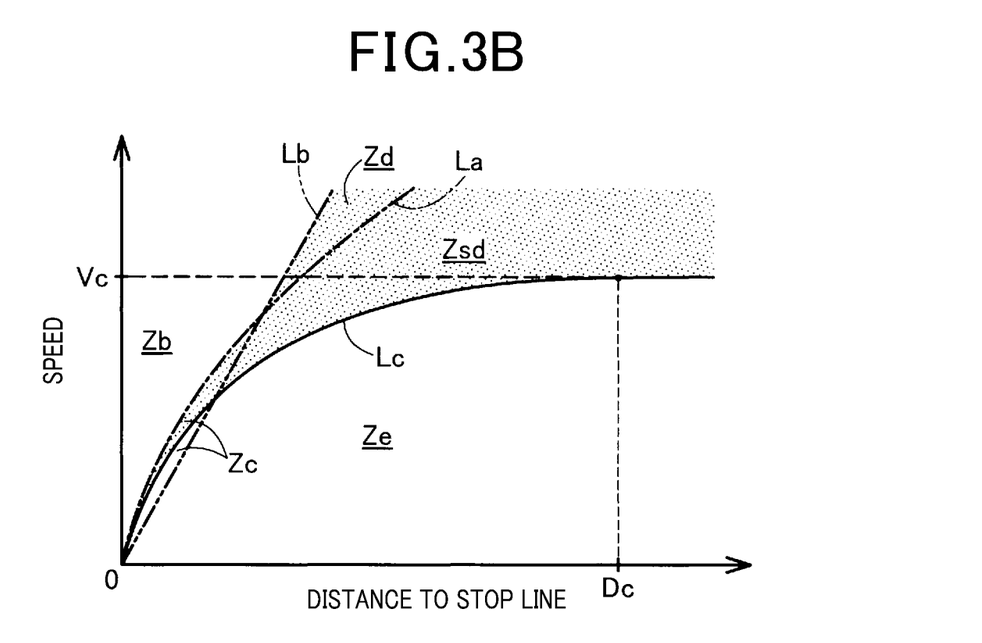
FIG. 3B is a diagram illustrating a soft deceleration target zone designated as a soft deceleration region.

Further, as shown in FIG. 3B, in addition to the curve La and the linear line Lb drawn in FIG. 3A, a boundary line Lc indicated by a solid line is added to a graph thereof. The boundary line Lc shows a relation between a speed and a position of the vehicle 30 when the vehicle 30 driving at a speed Vc at a position having a distance Dc thereto is stopped at the stop line LS drawn in the intersection IS by decelerating the vehicle 30 by a prescribed upper deceleration less than the normal stop limit deceleration. Here, the load upper limit deceleration may be a limit of deceleration by which a driver is expected to receive a small amount of load such as, for example, 0.1 G or more and 0.5 G or less, etc. Hence, when the display of the traffic signal 15 has changed to the yellow light and the speed and the position of the vehicle 30 are in the region Ze below the boundary line Lc, the vehicle 30 is slowly decelerated by an amount of deceleration less than the load upper limit deceleration and is possible to stop in front of the intersection IS.

Here, as shown in the drawing, the region sandwiched by the curve La and the boundary line Lc and the region sandwiched by the curve La and the linear line Lb collectively form a soft deceleration region Zsd with a dot hatching pattern. Specifically, the soft deceleration region Zsd includes a part of the optional zone Zc and the no options zone Zd. That is, when a speed and a position of the vehicle 30 are in the soft deceleration region Zsd, the vehicle 30 cannot be stopped in front of the intersection IS if it starts deceleration by an amount of deceleration less than the load upper limit deceleration at the time the display of the traffic signal 15 is changed to the yellow light. That is, the soft deceleration region Zsd is an region in which an amount of deceleration needed for the vehicle 30 to start decelerating when the display of the traffic signal 15 is changed from green to yellow and stop at the stop line LS of the intersection IS becomes greater than the load upper limit deceleration.

Hence, to perform drive control at the intersection IS, the vehicle control unit 100 calculates the boundary line Lc defined by a current speed Vc of the vehicle 30, a current position of the vehicle 30 represented by a distance Dc to the stop line LS and the above-described load upper limit deceleration, thereby designating the soft deceleration region Zsd.

Herein below, an exemplary control sequence performed in a first embodiment of the present disclosure is described with reference to FIGS. 4 and 5. As shown, the vehicle control unit 100 starts drive control when the position detector 126 detects an event that the vehicle 30 is driving toward the intersection IS.

That is, in step S10, the vehicle control unit 100 acquires a distance D from a current location of the vehicle 30 to the intersection IS. The vehicle control unit 100 then determines if the distance D is a prescribed threshold distance Dp or less. Here, the threshold distance Dp is a distance to enable traffic signal information SD to be received from the traffic control unit 20. Also, the threshold distance Dp is a distance to allow the vehicle control unit 100 to detect the stop line LS of the intersection IS with the camera 122.

The vehicle control unit 100 repeats steps S10 to S20 until the distance D becomes equal to or less than the threshold distance Dp. If the distance D becomes less than the threshold distance Dp, the vehicle control unit 100 determines if an intersection IS the vehicle 30 is heading towards has a traffic signal 15 controlled by the traffic control unit 20 in step S30. If there is no traffic signal 15 at the intersection IS, the vehicle control unit 100 terminates the drive control and returns to an original normal drive control.

By contrast, if there is the traffic signal 15 at the intersection IS, the vehicle control unit 100 designates the soft deceleration region Zs described in FIG. 3B in step S40. That is, as described above, the vehicle control unit 100 designates (calculates) the soft deceleration region Zsd based on the distance Dc from the vehicle 30 to the stop line LS drawn in the intersection IS at the time step S40 is executed, the speed Vc of the vehicle 30 at the time step S40 is executed, and the prescribed load upper limit deceleration value. Hence, the vehicle control unit 100 acquires the distance Dc by detecting the stop line LS drawn in the intersection IS based on a captured image IM captured by the camera 122.

Further, in step S50, the vehicle control unit 100 receives traffic signal information SD used in the traffic signal 15 from the traffic control unit 20 through the communication unit 120. Then, in step S60, the vehicle control unit 100 determines if the traffic signal information SD allows the vehicle 30 to enter the intersection IS. Specifically, the vehicle control unit 100 detects a current display to be displayed by the traffic signal 15 based on the traffic signal information SD, and determines if the display thereof allows the vehicle 30 to enter the intersection IS. In the present embodiment, a signal that does not allow the vehicle 30 to enter the intersection IS either a yellow light or a red light.

Then, if the current display of the traffic signal 15 included in the traffic signal information SD indicates a signal that does not allow the vehicle 30 to enter the intersection IS, the vehicle control unit 100 brings a soft deceleration flag FL into an ON state in step S100. This means that the soft deceleration control described later more in detail is determined to be executed. By contrast, if a current display of the traffic signal 15 included in the traffic signal information SD indicates a signal that allows the vehicle 30 to enter the intersection IS, such as a green light, etc., the vehicle control unit 100 executes a determination process in step S70.

Further, in step S70, based on the traffic signal information SD, the vehicle control unit 100 determines if a remaining time T until a time a display displayed by the traffic signal 15 is changed to a yellow signal as the next signal is either a threshold time Tth or less. Here, the threshold time Tth may be a time needed for the vehicle 30 to drive a distance Dc from a current position to the stop line LS at the approach limit speed. Hence, the vehicle control unit 100 acquires the remaining time T based on the traffic signal information SD and compares it with the threshold time Tth. Otherwise, the vehicle control unit 100 can calculate the remaining time T based on a switching cycle in which a display of the traffic signal 15 included in the traffic signal information SD is switched. Further, if the remaining time T is greater than the threshold time Tth (No, in step 70), the vehicle control unit 100 brings the soft deceleration flag FL into an off state in step S105. This means that the soft deceleration control described later in more detail is decided not to be performed.

By contrast, if the remaining time T is less than the threshold time Tth (Yes, in step S70), the vehicle control unit 100 predicts a position and a speed of the vehicle 30 at a timing when the remaining time T has elapsed and a display of the traffic signal 15 is changed at the time in step S80. That is, the vehicle control unit 100 calculates the position and the speed of the vehicle 30 after the remaining time T has elapsed based on information of a current position, a current speed, and a current acceleration of the vehicle 30. The position of the vehicle 30 as calculated is represented by a distance from the vehicle 30 to the stop line LS.

Subsequently, in step S90, the vehicle control unit 100 determines if the position and the speed of the vehicle 30 as predicted are outside the soft deceleration region Zsd designated (calculated) in step S40. If the position and the speed of the predicted vehicle 30 are included in the soft deceleration region Zsd (No, in step S90), the vehicle control unit 10 0 determines that the soft deceleration control is executed and brings the soft deceleration flag FL in to the ON state in step S100. If the position and the speed of the vehicle 30 as predicted are outside the soft deceleration region Zsd (Yes, in step S90), the vehicle control unit 100 determines that the soft deceleration control is not performed and brings the soft deceleration flag FL into the off state in step S105.

Hence, in the present disclosure, the above-described steps S50 to S105 collectively correspond to a step of determining a manner of the drive control performed in the vehicle 30 in accordance with traffic signal information SD and a current driving state of the vehicle 30. Further, in the present disclosure, steps S70 to S105 collectively correspond to a step of determining a manner of drive control perf in the vehicle 30 in accordance with both a timing when a display of the traffic signal 15 changes from a signal that allows the vehicle 30 to enter the intersection IS to the next signal and a position and a speed of the vehicle 30 at that timing.

Hence, in the first embodiment, process executed in steps S50 to S105 collectively determine if the soft deceleration control is possible in the vehicle 30.

Figure 5:
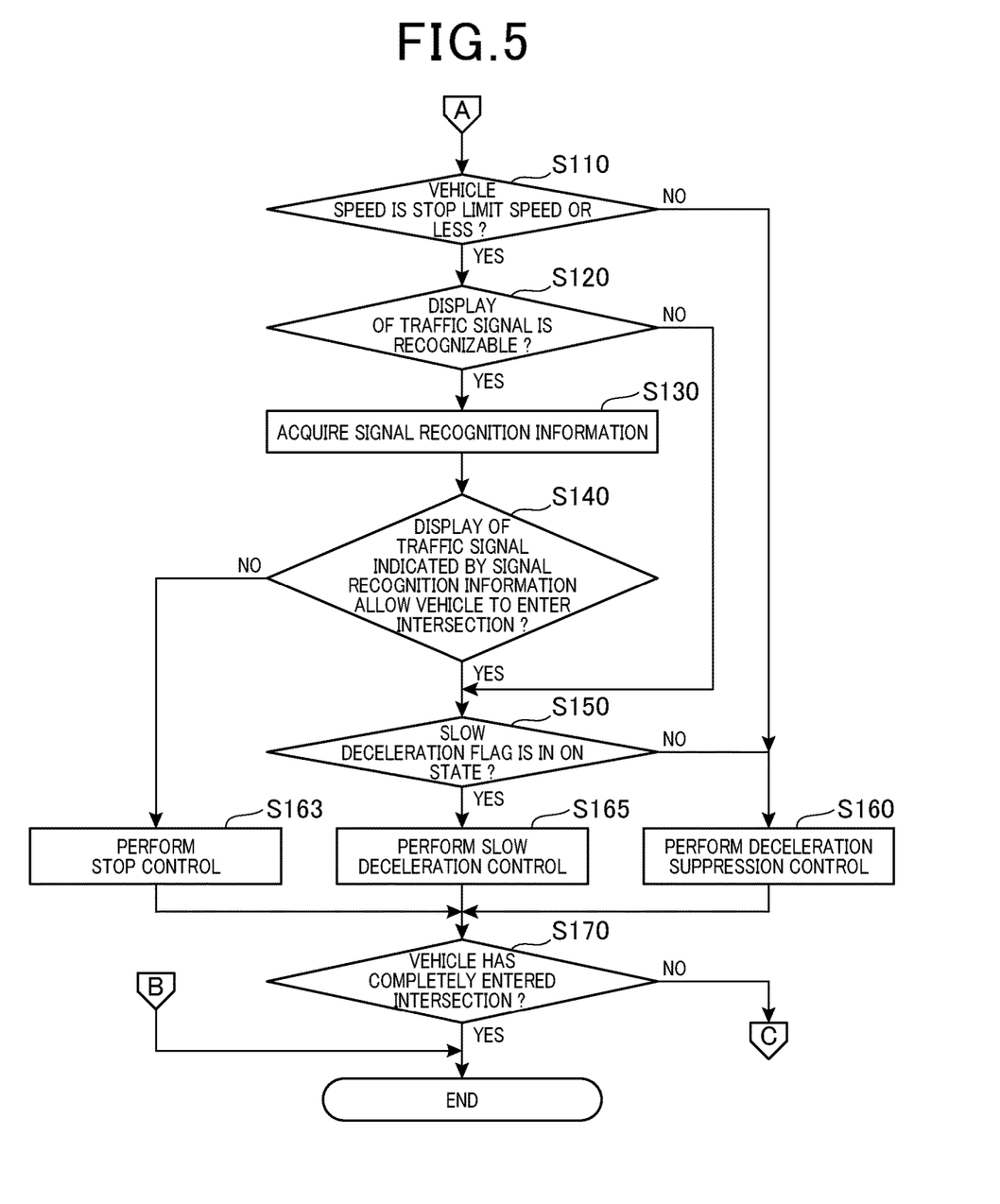
FIG. 5 is a second flowchart illustrating a sequence of drive control performed in the first embodiment of the present disclosure.

Subsequently, as shown in FIG. 5, in step S110, the vehicle control unit 100 determines if a speed of the vehicle 30 is a stop limit speed designated for a current position of the vehicle 30 or less. If the speed of the vehicle 30 is greater than the stop limit speed (No, in step S110), the vehicle control unit 100 performs the deceleration suppression control in step S160. That is, by executing the deceleration suppression control, the vehicle 30 is suppressed to run below a current speed, and is maintained to run at the current speed or a higher speed than that. The reason for performing the deceleration suppression control when a speed of the vehicle 30 is greater than the stop limit speed is that it is desirable for the vehicle 30 in view of the speed thereof to pass the intersection IS rather than suddenly stop before the intersection IS. That is, when suddenly stopping before the intersection IS, a driver or occupant receives a certain amount of load.

By contrast, in step S110, when a speed of the vehicle 30 is below the stop limit speed (Yes, in step S110), the vehicle control unit 100 determines if the traffic signal detector 124 can recognize a display of the traffic signal 15 in step S120. Here, the vehicle control unit 100 determines that the traffic signal detector 124 cannot recognize the display of the traffic signal 15 when a distance to the intersection IS is greater than the distance Dt as the threshold distance acting as the detection range DA for the position detector 126. This is because, the traffic signal 15 is not located within the detection range DA for the position detector 126, and accordingly a credibility of a detection result of the traffic signal detector 124 is low. By contrast, when the distance to the intersection IS less the distance Dt, the vehicle control unit 100 determines that the traffic signal detector 124 can recognize the display of the traffic signal 15. That is, in such a situation, the traffic signal 15 is located within the detection range DA for the position detector 126 to detect, and accordingly, reliability of the detection result obtained by the traffic signal detector 124 is higher than a prescribed level.

In step S120, if it is determined that the distance to the intersection IS is greater than the distance Dt (No, in step S120), the vehicle control unit 100 omits steps S130 to S140 performed based on signal recognition information SR, and executes a determination process of determining about a soft deceleration flag FL in step S150 described later more in detail. Thus, a detection result obtained by the traffic signal detector 124 having a lower quality than a reference can be suppressed from affecting drive control performed in the vehicle 30.

By contrast, when it is determined that a distance to the intersection IS is the distance Dt or less (Yes, in step S120), and accordingly the traffic signal detector 124 can recognize a display of the traffic signal 15, the vehicle control unit 100 acquires signal recognition information SR from the position detector 126 in step S130. Subsequently, in step S140, the vehicle control unit 100 determines if a display of the traffic signal 15 indicated by the traffic signal recognition information SR is a signal that allows the vehicle 30 to enter the intersection IS. Specifically, as described herein below, depending on a determination made in step S140, it is determined either to perform drive control in step S160 or S165 in accordance with the soft deceleration flag FL designated in steps S50 to S105 or to perform stop deceleration control in step S163 regardless of designation of the soft deceleration flag FL. That is, in the present disclosure, step S140 corresponds to a step of determining whether to maintain a manner of driving control determined in steps S50 to S105 based on the traffic signal recognition information SR.

That is, if a display of the traffic signal 15 included in the traffic signal recognition information SR is not a signal that allows the vehicle 30 to enter the intersection IS, the vehicle control unit 100 performs stop deceleration control in step S163. By the stop deceleration control, the vehicle 30 is decelerated to stop in front of the stop line LS. More specifically, in the stop deceleration control, the vehicle 30 is decelerated by an amount of deceleration less than the load upper limit deceleration and greater than a deceleration used in soft deceleration control as described later in detail. Here, since the speed of the vehicle 30 is determined to be less than the stop limit speed in step S110, the vehicle 30 can be stopped before entering the intersection IS.

In this way, when the traffic signal recognition information SR indicates that a display of the current traffic signal 15 is any signal other than a signal that allows the vehicle 30 to enter the intersection IS, the stop deceleration control is performed regardless of the manner of driving control determined in steps S50 to S105. Thus, it is suppressed that the vehicle 30 enters the intersection IS without following the actual display of the traffic signal 15 as detected by the traffic signal detector 124.

Further, in step S140, when it is determined that a display of the traffic signal 15 indicated by signal recognition information SR is a signal that allows the vehicle 30 to enter the intersection IS (Yes, in step S140), the vehicle control unit 100 determines if the soft deceleration flag FL is in the ON state in step S150. If the deceleration flag FL is in the OFF state (No, in step S150), the vehicle control unit 100 executes the above-described deceleration suppression control in step S160. That is, when the soft deceleration flag FL is in the off state in this stage, it is supposed that the traffic signal 15 changes to a yellow light before the vehicle 30 enters the intersection IS and a position and a speed of the vehicle 30 are located outside the soft deceleration region Zsd at the time the traffic signal 15 changes to the yellow light. Accordingly, as long as the soft deceleration flag FL is in the OFF state (No, in step S150) even if a current speed is maintained, the vehicle 30 can be stopped in front of the stop line LS when a signal is changed to a yellow signal by decelerating the vehicle 30 at the load upper limit deceleration or less. Accordingly, deceleration suppression control is determined and executed in step S160, so that driving of the vehicle 30 at a current speed or more is maintained.

By contrast, in step S150, when the deceleration flag FL is in the ON state, the vehicle control unit 100 executes the soft deceleration control in step S165. That is, to let a position and a speed of the vehicle 30 deviate from the soft deceleration region Zsd, the soft deceleration control is executed such that the vehicle 30 is decelerated by an amount of deceleration less than the deceleration of the vehicle 30 performed in the stop deceleration control and the load upper limit deceleration. That is, with the soft deceleration control, the speed of the vehicle 30 can be reduced to a level at which the vehicle 30 can be smoothly stopped in front of the intersection IS while suppressing an amount of load caused by the deceleration on a driver.

Further, after executing any one of drive controls in steps S160, S163 and S165, the vehicle control unit 100 determines if the vehicle 30 has completely entered the intersection IS, i.e., the vehicle 30 passed the stop line LS, in step S170. If the vehicle 30 has completely entered the intersection IS, the vehicle control unit 100 terminates the drive control to be executed at the intersection IS. By contrast, if the vehicle 30 has not yet completely entered the intersection IS, the vehicle control unit 100 repeats the processes of step S50 and subsequent steps. Here, according to this drive control, when the soft deceleration control is once executed in step S165, the soft deceleration control is maintained until a predicted position and a predicted speed of the vehicle 30 deviate from the soft deceleration region Zsd at a timing the traffic signal changes to the yellow signal in step S90.

As described heretofore, according to the traffic control system 10 of the first embodiment, when the vehicle 30 enters the intersection IS, driving of the vehicle 30 is controlled based on the traffic signal information SD acting as control information controlling the traffic signal 15 and the signal recognition information SR indicating the actual display of the traffic signal 15. With this configuration, for example, even if an operation timing at which the traffic signal 15 operates is deviated from a command indicated by the traffic signal information SD, such a deviation can be handled by the traffic signal recognition information SR. In this way, based on two types of information indicating conditions of the traffic signal 15, drive control of the vehicle 30 can be more appropriately achieved in accordance with an actual traffic condition.

In the above-described drive control, whether to maintain the manner of the driving control determined based on the traffic signal information SD in steps S50 to S105 is determined in step S140 based on the traffic signal recognition information SR. According to this configuration, the manner of drive control performed in the vehicle 30 can be determine in a relatively early stage based on the traffic signal information SD controlling the traffic signal 15. Further, since determination is made based on the signal recognition information SR reflecting an actual display condition of the traffic signal 15, it can be either suppressed or reduced that a manner of driving control determined based on the traffic signal information SD does not correspond to the actual display condition of the traffic signal 15.

Further, as executed in steps S80 to S105, the above-described manner of drive control performed in the vehicle 30 is determined based on first and second information. That is, the first information is a timing when the signal included in the display of the traffic signal 15 to allow the vehicle 30 to enter the intersection IS changes to the next signal as calculated based on the traffic signal information SD. The second information is the position and the speed of the vehicle 30 at the timing when the signal changes to the next signal as calculated based on the current driving state of the vehicle 30. Hence, according to this configuration, in accordance with the timing when the display of the traffic signal 15 changes from the traffic signal that allows the vehicle 30 to enter the intersection IS to the next signal, the driving of the vehicle 30 is properly controlled. Accordingly, driving control can be effectively performed in the vehicle 30 corresponding to the actual display of the traffic signal 15.

Further, the above-described manner of drive control performed in the vehicle 30 includes the stop deceleration control to stop the vehicle 30 before it enters the intersection IS, the soft deceleration control to decelerate the vehicle 30 by a degree less than the prescribed normal stop limit deceleration, and the deceleration suppression control to suppress deceleration of the vehicle 30. Hence, according to this configuration, the vehicle 30 can be stopped, gradually decelerated, and driven to continuously run at a speed higher than a current speed according to the display of the traffic signal 15. Accordingly, driving of the vehicle 30 in the intersection IS can be more appropriately controlled.

Further, in the above-described drive control, when the display of the current traffic signal 15 included in the traffic signal recognition information SR indicates a signal other than a signal that allows the vehicle 30 to enter the intersection IS in step S140, the vehicle 30 is stopped before entering the intersection IS in step S163 regardless of the manner of the driving control determined in steps S50 to S105. According to this configuration, regardless of the actual display of the traffic signal 15, the vehicle 30 is inhibited to enter the intersection IS.

Further, in the above-described drive control, the soft deceleration region Zsd is designated based on the current position relative to the intersection IS and the speed of the vehicle 30 in step S40. As described above, the deceleration region Zsd is a region calculated based on the current position relative to the intersection IS and the speed of the vehicle 30, in which a vehicle 30 is decelerated by an amount greater than a prescribed deceleration to stop at the stop line LS of the intersection IS as a target. Hence, in the above-described drive control, it is determined in steps S80 to S90 whether the position relative to the intersection IS and the speed of the vehicle 30 are located in the soft deceleration region Zsd when the display of the traffic signal 15 changes from the display that allows the vehicle 30 to enter the intersection IS to the next display based on the traffic signal information SD and the current position relative to the intersection IS and the speed of the vehicle 30. Also, in the above-described drive control, when it is determined that the position relative to the intersection IS and the speed of the vehicle 30 are in the soft deceleration region Zsd, execution of the control to decelerate the vehicle 30 is determined, and the soft deceleration flag FL is brought into the ON state in step S100. According to this configuration, the vehicle 30 can be controlled in advance to be decelerated by an amount of deceleration minimizing an amount of load applied to a driver when the display of the traffic signal 15 changes from the traffic signal that allows the vehicle 30 to enter the intersection IS to the next signal.

Now, a second embodiment of the present disclosure is described with reference to FIG. 6. Specifically, as shown in the drawing, a sequence of drive control performed in the intersection IS in the second embodiment is substantially the same as performed in the first embodiment except for the following steps. That is, steps S131 and S133 are newly employed instead of step S130. Also, a reliability determination process (i.e., step S145) is newly employed instead of step S163. Hence, a configuration of a traffic control system 10 employed in the second embodiment is substantially the same as employed in the first embodiment.

Figure 4:
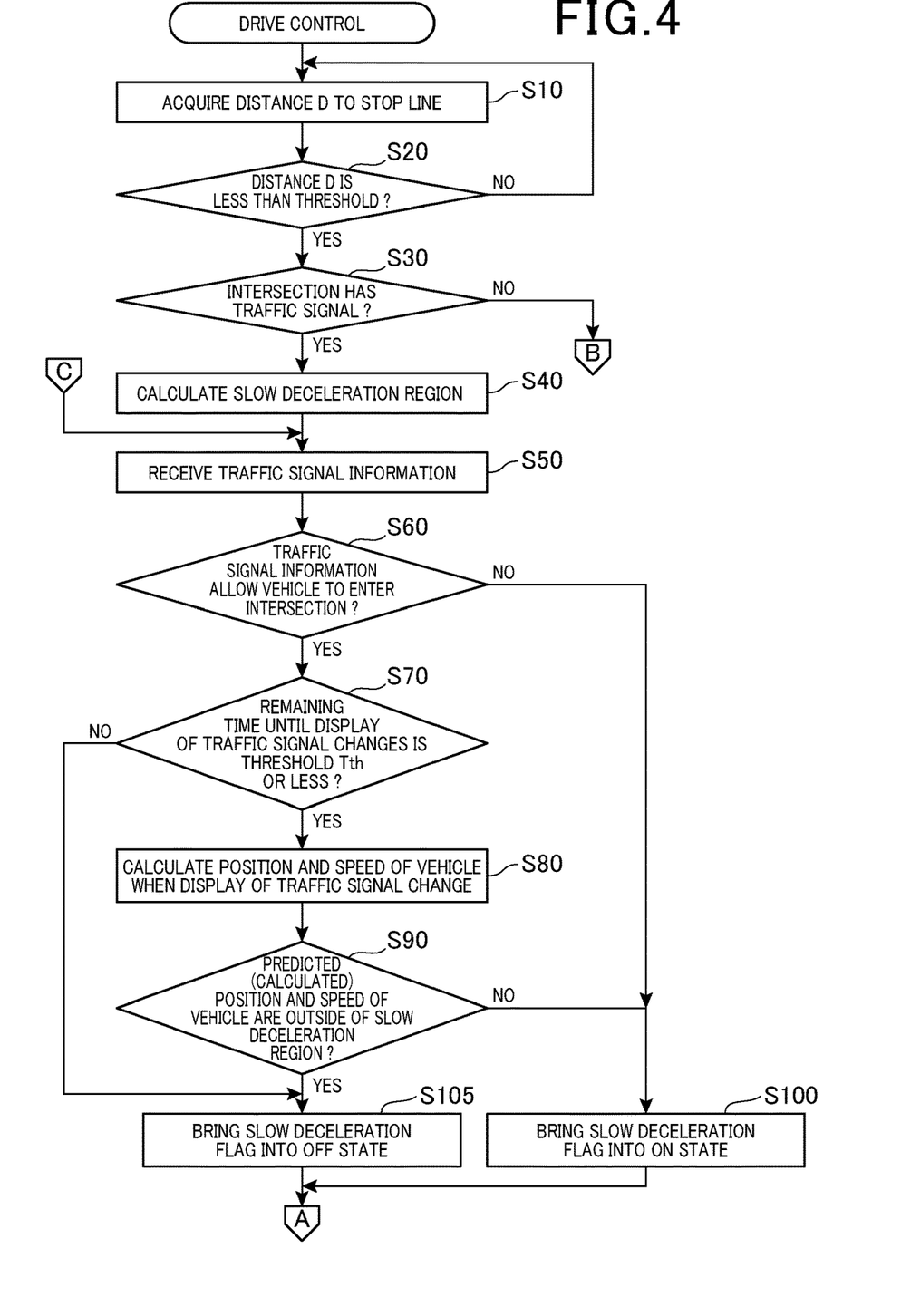
FIG. 4 is a first flowchart illustrating a sequence of drive control performed in the first embodiment of the present disclosure.
Figure 6:
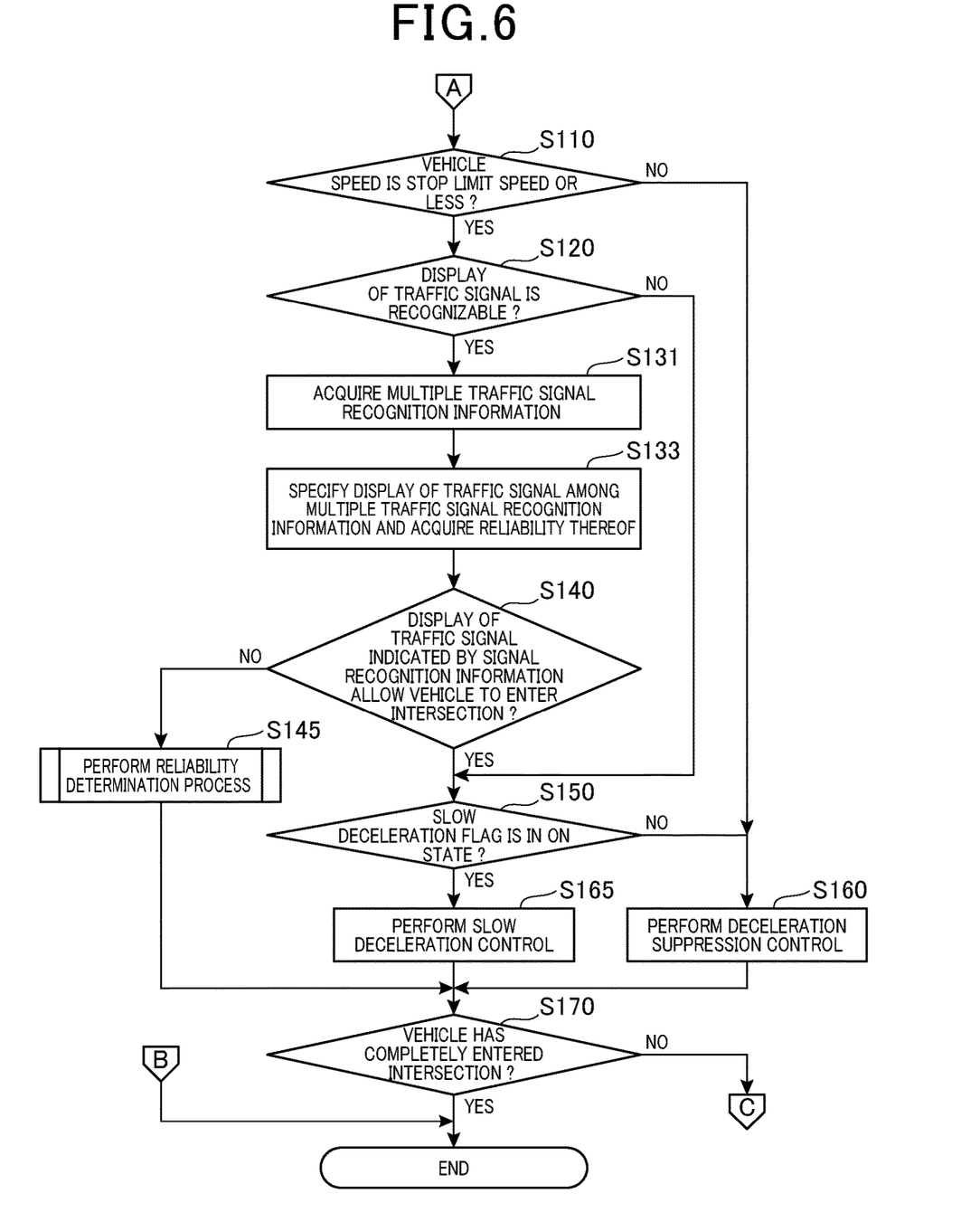
FIG. 6 is a flowchart illustrating an exemplary sequence of drive control according to a second embodiment of the present disclosure.

Specifically, in the second embodiment, as drive control, after completing processes of steps S10 to S105 in the same manner as in the first embodiment shown in FIG. 4, each of processes is performed in step S110 and subsequent steps as shown in FIG. 6. That is, in step S110 and each of subsequent steps, processing is substantially similarly performed as executed in the first embodiment except for the following processing.

That is, in step S131, the vehicle control unit 100 acquires multiple items of signal recognition information SR at different times, respectively. Specifically, in step S131, the signal detector 124 obtains captured images IM captured by the camera 122 reflecting the traffic signal 15 from the traffic signal detector 124, for example, at micro time intervals of from few milliseconds to several hundred milliseconds. The signal detector 124 then analyzes each of the captured images IM and generates multiple items of signal recognition information SR each indicating a display of the traffic signal 15. Then, the vehicle control unit 100 acquires these signal recognition information SR from the signal detector 124.

Subsequently, in step S133, the vehicle control unit 100 specifies a current display displayed by the traffic signal 15 among the multiple items of signal recognition information SR and calculates reliability of detection thereof. Specifically, the vehicle control unit 100 acquires a frequency of each of the displays of the traffic signal 15 indicated by each of the traffic signal recognition information SR. Then, the vehicle control unit 100 determines that a display with the largest frequency is the current display displayed by the traffic signal 15 and indicated by the traffic signal recognition information SR, thereby acquiring the frequency as information indicating reliability of the traffic signal recognition information SR. Hence, the smaller the variation in analysis of the traffic signal recognition information SR, the higher the reliability.

Further, in step S140, the below described determination is made based on the current display of the traffic signal 15 as specified in step S133. That is, when a display of the traffic signal 15 indicated by the traffic signal recognition information SR is a signal other than a signal that allows the vehicle 30 to enter the intersection IS (No, in step S140), a reliability determination process is subsequently performed in step S145 as illustrated in FIG. 7.

Figure 7:
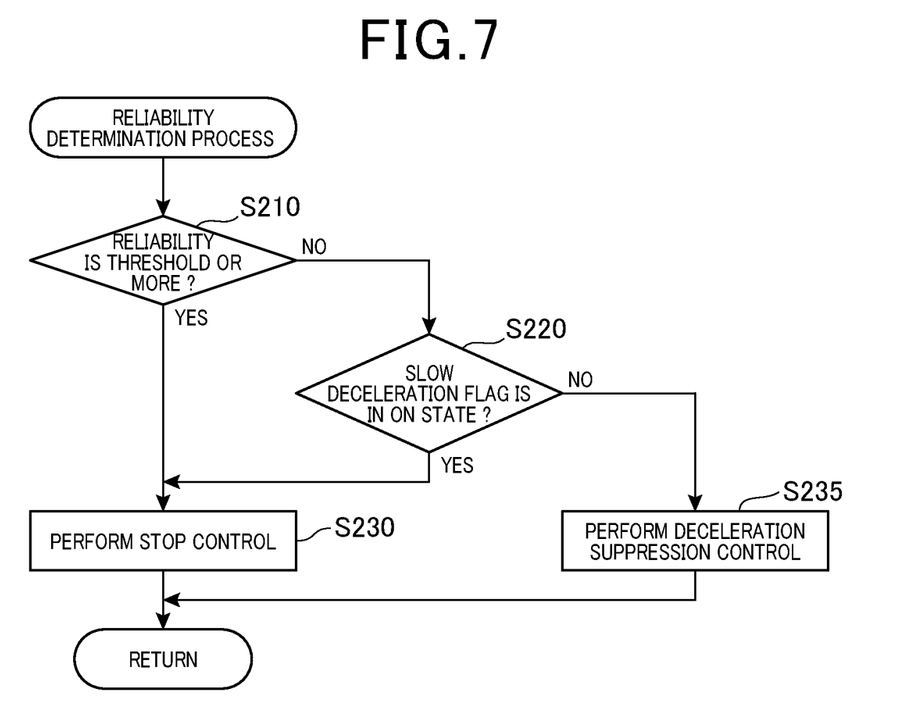
FIG. 7 is a flowchart illustrating an exemplary sequence of a reliability determination process implemented in the second embodiment.

Specifically, as shown in FIG. 7, in step S210, the vehicle control unit 100 determines if the reliability of the traffic signal recognition information SR acquired in step S135 is the threshold value acting as a prescribed reference or more. If the reliability of the traffic signal recognition information SR is more than the threshold value (Yes, in step 210), the stop deceleration control performed in step S163 performed in the first embodiment shown in FIG. 5 is similarly performed in step S230, so that the vehicle 30 is stopped before entering the intersection IS. That is, an actual display of the traffic signal 15 at present is likely to be either a yellow light or a red light that does not allow the vehicle 30 to enter the intersection IS.

By contrast, if the reliability of the traffic signal recognition information SR is less than the threshold value (No, in step S210), the vehicle control unit 100 determines if the soft deceleration flag FL is in the ON state in step S220. Here, the soft deceleration flag FL can be in the ON state in this stage of step S220, if traffic signal information SD includes a display of the traffic signal 15 indicating a signal other than a signal that allows the vehicle 30 to enter the intersection IS as determined in step S60 of FIG. 4. In such a situation, step S220 is executed if it is determined in step S140 of FIG. 6 that the traffic signal recognition information SR indicates that a display of the traffic signal 15 is not a signal that allows the vehicle 30 to enter the intersection IS. That is, it means that the display of the traffic signal recognition information SR is consistent with the display of the traffic signal 15 indicated by the traffic signal information SD when the soft deceleration flag FL is in the ON state in step S220 of FIG. 7. Hence, in such a situation, even if the reliability of the traffic signal recognition information SR is low, the vehicle control unit 100 performs the stop deceleration control in step S230 as in the situation where the reliability of the traffic signal recognition information SR is high.

Also, the soft deceleration flag FL can be in the ON state in the stage of step S220, when a position relative to the intersection IS and a speed of the vehicle 30 are predicted in step S90 of FIG. 4 to be in the soft deceleration region Zsd when a display of the traffic signal 15 indicated by the traffic signal information SD changes. In such a situation, since it has been determined in step S70 that the remaining time T until the display of the traffic signal 15 changes is less than the threshold time Tth, there is a risk that the display of the actual traffic signal 15 may change to a display that does not allow the vehicle 30 to enter the intersection IS. In addition, since the current speed of the vehicle 30 has been determined to be less than the stop limit speed in step S110 of FIG. 6, the vehicle 30 is in a state possible to stop before entering the intersection IS. Accordingly, also in such a situation, even if a degree of reliability of the traffic signal recognition information SR is low, the vehicle control unit 100 performs the stop deceleration control in step S230 as performed when the reliability of the traffic signal recognition information SR is high.

Now, control executed when the soft deceleration flag FL is determined to be in the OFF state in step S220 is herein below described. Specifically, the soft deceleration flag FL can be in the OFF state in the stage of step S220, if a display of the traffic signal 15 is determined based on the traffic signal information SD to be a signal that allows the vehicle 30 to enter the intersection IS in step S60 of FIG. 4. That is, when the soft deceleration flag FL is in the OFF state in step S220 of FIG. 6, it is meant that the display of the traffic signal 15 detected based on the traffic signal information SD is inconsistent with the display detected based on the traffic signal recognition information SR. In such a situation, since the reliability of the traffic signal recognition information SR is low, the vehicle control unit 100 performs the deceleration suppression control in step S235 in accordance with the display of the traffic signal 15 detected based on the traffic signal information SD.

Further, when either step S230 or step S235 has been executed, the vehicle control unit 100 returns to the sequence of the drive control illustrated in FIG. 6 and determines if the vehicle 30 has entered the intersection IS in step S170. The vehicle control unit 100 repeats processes of step S50 and subsequent steps illustrated in FIG. 4 until the vehicle 30 has entered the intersection IS.

As described heretofore, according to the drive control of the second embodiment, the vehicle control unit 100 determines the reliability of the traffic signal recognition information SR in the reliability determination process in step S145. Specifically, when it determines that the reliability of the traffic signal recognition information SR is below the threshold value and does not meet the prescribed condition, the vehicle control unit 100 maintains the manner of the driving control determined based on the traffic signal information SD without reflecting the traffic signal recognition information SR to the drive control of the vehicle 30. Thus, drive control performed in the vehicle 30 based on the traffic signal recognition information SR with low reliability not following the display of the traffic signal 15 can be either inhibited or reduced. Further, according to the traffic control system 10 and a method of controlling thereof in the second embodiment, various advantages can be similarly obtained as obtained in the first embodiment.

Figure 8:
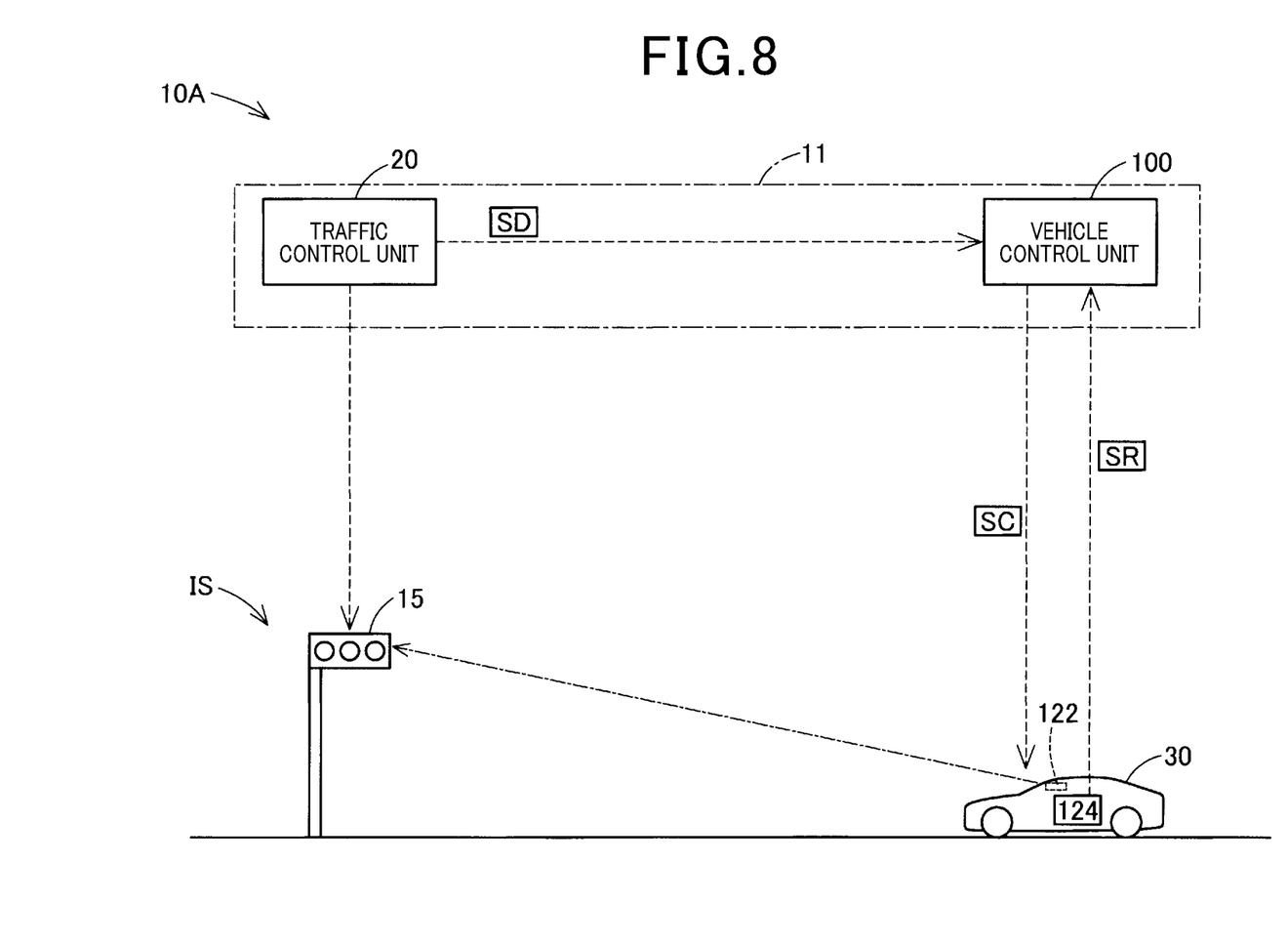
FIG. 8 is a schematic diagram illustrating a traffic control system according to a third embodiment of the present disclosure.

Now, a third embodiment of the present disclosure is described with reference to FIG. 8. Specifically, a traffic control system 10A of the third embodiment has substantially the same configuration as the traffic control system 10 of the first embodiment except that the vehicle control unit 100 is not mounted on the vehicle 30 and is located outside the vehicle 30. As shown, similar to the traffic control unit 20, the vehicle control unit 100 serves as a control device included in a traffic control center 11. Specifically, the vehicle control unit 100 remotely controls the vehicle 30 by transmitting a driving control signal SC via wireless communication to instruct the vehicle 30 to run. The vehicle control unit 100 performs the same drive control as performed in the first embodiment based on traffic signal information SD obtained from the traffic control unit 20 and signal recognition information SR obtained from the traffic signal detector 124 mounted on the vehicle 30. Hence, with the traffic control system 10A of the third embodiment, various effects can be similarly obtained as obtained in the first embodiment. Here, in the traffic control system 10A of the third embodiment, the vehicle control unit 100 may perform substantially the same drive control as executed in the second embodiment.

Figure 9:
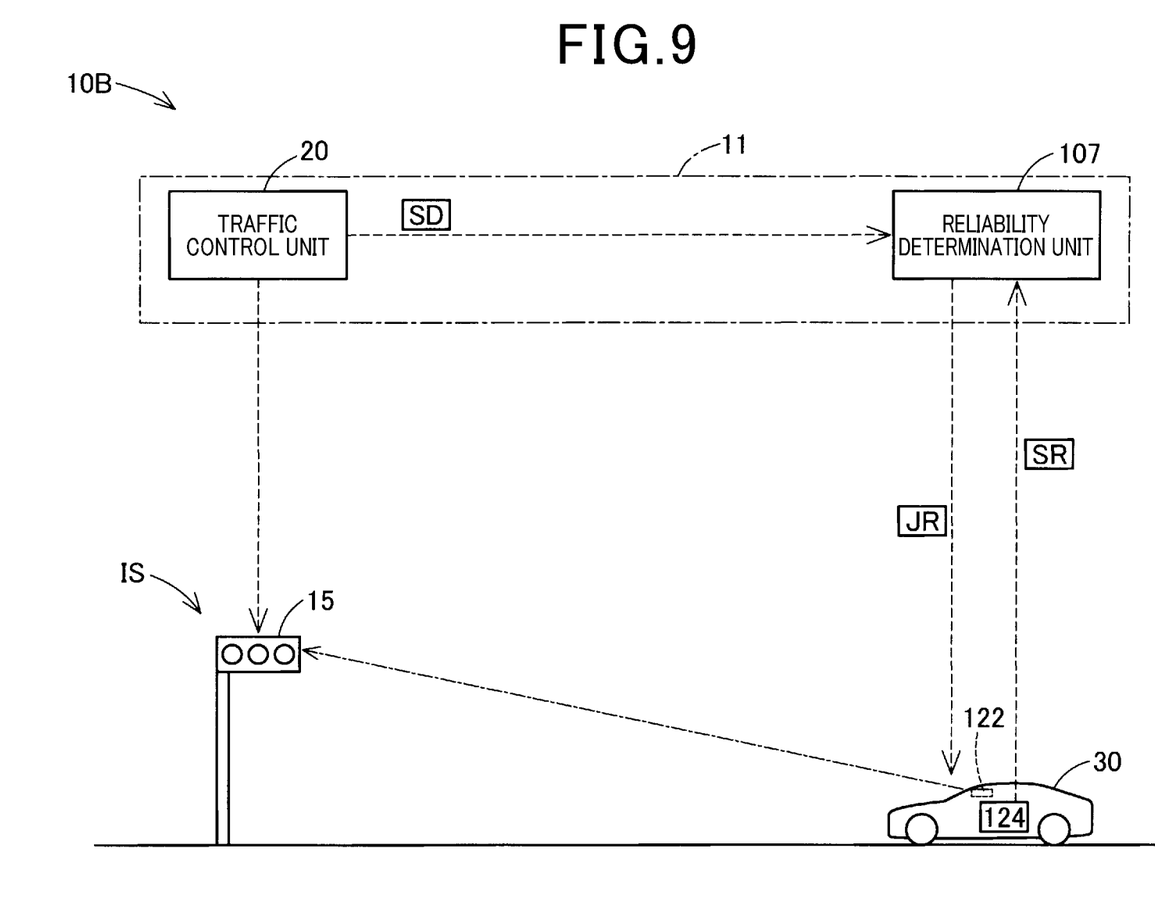
FIG. 9 is a schematic diagram illustrating a traffic control system according to a fourth embodiment of the present disclosure.

Now, a fourth embodiment of the present disclosure is described with reference to FIG. 9. Specifically, a traffic control system 10B of the 4th embodiment has substantially the same configuration as the traffic control system 10 of the first embodiment except that the reliability determination unit 107 is provided outside the vehicle 30. Specifically, in a traffic control system 10B of the fourth embodiment, the vehicle control unit 100 located in the vehicle 30 performs substantially the same drive control as performed in the second embodiment in cooperation with the reliability determination unit 107. Specifically, the reliability determination unit 107 obtains signal recognition information SR from the traffic signal detector 124 via wireless communication on behalf the vehicle control unit 100. The reliability determination unit 107 also executes processing in step S135 on behalf of the vehicle control unit 100 and obtains a reliability of traffic signal recognition information SR thereby executing a determination process in step S210. The reliability determination unit 107 then transmits a result of the determination JR to the vehicle control unit 100. Subsequently, the vehicle control unit 100 executes respective processing in steps S220, S230 and S235 based on the determination result JR as received. Hence, with the traffic control system 10B of the 4th embodiment, various effects can be similarly obtained as obtained in the third embodiment.

Now, various modifications of the above-described embodiments can be herein below described. That is, the various configurations described heretofore in each of the embodiments can be modified as described below.

First, a modified vehicle control unit 100 may differently perform drive control from that performed in each of the embodiments at the intersection IS based on traffic signal information SD and signal recognition information SR as described herein below. For example, the vehicle control unit 100 can execute driving control based on the traffic signal information SD before a distance D to the intersection IS becomes less than the threshold distance Dp (i.e., the distance D is the threshold distance Dp or more). In addition, the vehicle control unit 100 can always execute traffic control based on the traffic signal recognition information SR when the distance D is less than the threshold distance Dp. Alternatively, by predicting a timing when a display of the traffic signal 15 is switched, the vehicle control unit 100 may execute driving control based on the traffic signal recognition information SR until such a timing.

Secondly, as another modified driving control performed in the vehicle 30 at the intersection IS, driving control different from each of the stop deceleration control, deceleration suppression control and the soft deceleration control executed in the above-described embodiments can be performed. For example, acceleration control to accelerate a vehicle, speed maintenance control to maintain a speed of a vehicle and steering angle control to control steering angles of wheels of a vehicle for right and left turns may be performed. Further, the soft deceleration control can be omitted.

Further, technical ideas disclosed heretofore in the present disclosure can be embodied in various forms other than the above-described control method and system of the vehicle. For example, the technical ideas of the present disclosure can be realized in a control device included in a vehicle, a vehicle including the control device, a traffic control system including the control device, a computer program for realizing the above-described control method and a storage medium storing the computer program.

The control unit and method described heretofore in the present disclosure may be realized by a dedicated computer prepared by including a memory and a processor programmed to perform one or more functions embodied by computer program. Alternatively, the control unit and method described heretofore in the present disclosure can be realized by a dedicated computer prepared by including a processor composed of one or more dedicated hardware logic circuits. Otherwise, the control unit and method described heretofore in the present disclosure can be realized by one or more dedicated computers prepared in combination with a processor programmed to perform multiple functions, a memory and another processor configured by one or more hardware logic circuits. Further, the computer program may be stored in a computer readable non-transitory tangible recording medium as an instruction executed by a computer.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described method or system controlling the vehicle and may be altered as appropriate.

What is claimed is:

1. A method of controlling a vehicle, comprising the steps of:
   receiving traffic signal display information from a traffic control unit controlling a display of a traffic signal located near an intersection when a vehicle is driving toward the intersection, the traffic signal display information indicating a current display state of the traffic signal and a remaining time when the current display state of the traffic signal continues;
   acquiring traffic signal recognition information by detecting and recognizing a current display of the traffic signal with a traffic signal detector mounted on the vehicle when the vehicle is driving toward the intersection; and
   controlling the vehicle to drive based on the traffic signal display information and the traffic signal recognition information when the vehicle enters the intersection.

2. The control method according to claim 1, wherein the step of controlling the vehicle to drive includes the sub-steps of:
   determining a manner of drive control performed in the vehicle based on the traffic signal display information, and
   determining if the manner of the drive control determined based on the traffic signal display information is maintained based on the traffic signal recognition information.

3. The control method according to claim 2, wherein the step of determining the manner of driving control includes the sub-step of determining a manner of driving control based on:
   a timing when the display of the traffic signal changes from a signal that allows the vehicle to enter the intersection to the next signal, the timing being obtained from the traffic signal display information; and
   a position of the vehicle relative to the intersection at the timing when the display changes and a speed of the vehicle at the timing, the position and the speed being calculated based on a current driving condition of the vehicle.

4. The control method according to claim 2, wherein the manner of driving control is performed by at least one of the steps of;
   decelerating the vehicle by an amount of deceleration to stop the vehicle before the intersection without causing an excessive load on a driver,
   inhibiting deceleration of the vehicle to allow the vehicle to enter the intersection before a display of the traffic signal turns to red, and
   decelerating the vehicle by an amount of deceleration less than a prescribed amount of deceleration in which a vehicle can safely stop before an intersection after a display of the traffic signal turns to yellow, the deceleration causing the vehicle to either stop before the intersection without causing an excessive load on a driver or allow the vehicle to enter the intersection before a display of the traffic signal turns to red.

5. The control method according to claim 2, wherein the step of controlling the driving of the vehicle includes the sub-step of:
   determining if the traffic signal recognition information indicates that a current display of the traffic signal is other than a display that allows the vehicle to enter the intersection; and
   stopping the vehicle before entering the intersection regardless of the manner of the driving control determined based on the traffic signal display information when the traffic signal recognition information indicates that the current display of the traffic signal is other than a display that allows the vehicle to enter the intersection.

6. The control method according to claim 2, further comprising the step of externally obtaining an instruction indicating the manner of the driving control determined in the manner determining step.

7. The control method according to claim 1, wherein the step of controlling the driving of the vehicle includes the sub-steps of:
   calculating a soft deceleration region based on a position of the vehicle relative to the intersection and a current speed of the vehicle, in which an amount of deceleration needed for the vehicle to stop at a stop line in the intersection becomes greater than a prescribed deceleration by which a driver is expected to receive a small amount of load,
   determining if a current position of the vehicle relative to the intersection and a speed of the vehicle are within the soft deceleration region when the display of the traffic signal changes from the display that allows the vehicle to enter the intersection to the next signal, the time the display of the traffic signal changes being determine based on the traffic signal display information; and
   determining that the soft deceleration control should be performed in the vehicle when it is determined that the current position relative to the intersection and the speed of the vehicle are within the soft deceleration region at the time.

8. The control method according to claim 1, further comprising the steps of:
   determining if reliability of the traffic signal recognition information is higher than a prescribed level; and
   inhibiting reflection of the traffic signal recognition information to the drive control performed in the vehicle if the reliability is determined to be lower than the prescribed level.

9. The control method according to claim 8, further comprising the step of externally obtaining the determination result generated in the liability determination step.

10. A control system that controls a vehicle, the control system comprising:

a traffic control unit to control a display of a traffic signal located near an intersection;

a vehicle control unit to control driving of the vehicle; and a signal detector to detect a display currently displayed on the traffic signal, the signal detector being mounted on the vehicle, wherein the vehicle control unit controls driving of the vehicle entering the intersection based on, traffic signal display information indicating both a current display state of the traffic signal and a remaining time the current display state of the traffic signal continues, the traffic signal display information being received from the traffic control unit when the vehicle approaches the intersection, and signal recognition information indicating a current display of the traffic signal obtained from the traffic signal detector.

\* \* \* \* \*